(No Model.)
E. W. STONE.
HOLDER FOR COVERS.
No. 434,844.  Patented Aug. 19, 1890.
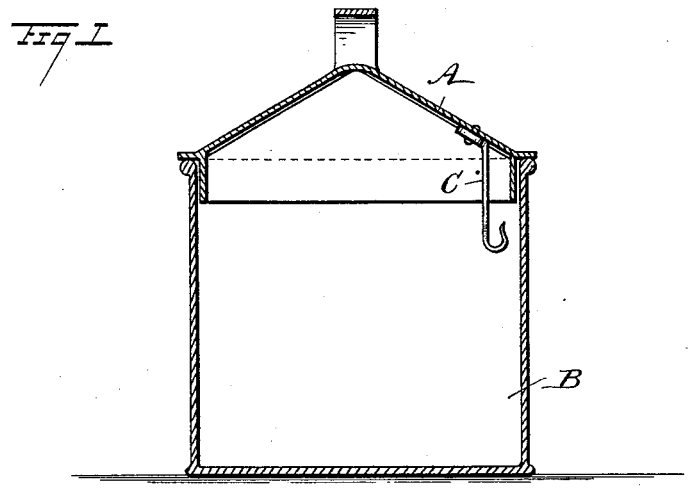
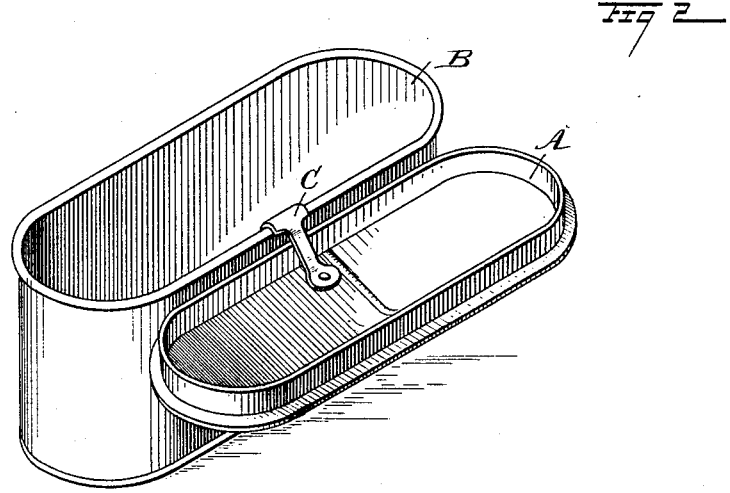
WITNESSES:
H. Walker
C. Sedgwick
INVENTOR:
E. W. Stone
BY Munn & Co.
ATTORNEYS

UNITED STATES PATENT OFFICE.

EDWARD W. STONE, OF CHICAGO, ILLINOIS.

HOLDER FOR COVERS.

SPECIFICATION forming part of Letters Patent No. 434,844, dated August 19, 1890.

Application filed April 7, 1890. Serial No. 346,961. (No model.)

*To all whom it may concern:*

Be it known that I, EDWARD W. STONE, of Chicago, in the county of Cook and State of Illinois, have invented a new and Improved Cover-Holder, of which the following is a full, clear, and exact description.

The object of the invention relates to holders to be attached to covers for kitchen utensils, such as pots, wash-boilers, &c.; and its object is to provide a new and improved attachment for covers, so that the cover to which it is attached can be readily suspended in or about in a horizontal position on the outside of the vessel to which it belongs, so as to prevent the condensed steam usually gathering on the cover when the latter is on cooking or washing vessels and when clothes are being taken out of a wash-boiler from dripping onto the hot stove or floor, and also to form when suspended horizontally a convenient receptacle for placing knives, forks, soap, &c.

The invention consists of a spring-hook attached to a cover and arranged in such a manner as to hold the cover in or about in a horizontal position when the hook is hooked onto the upper rim of the vessel.

Reference is to be had to the accompanying drawings, forming a part of this specification, in which similar letters of reference indicate corresponding parts in both the figures.

Figure 1 is a sectional side elevation of the improvement, the cover being applied to the vessel; and Fig. 2 is a perspective view of the same, showing the application of the spring-hook.

The cover A is fitted in the usual manner to form the top of the vessel B. On the under side of the cover A is held a spring-hook C, which extends when the cover is applied on the vessel in about a vertical position, with the hook end downward, as is plainly shown in Fig. 1. When it is desirable to uncover the vessel B and to dispose of the cover in a convenient manner, the cover A when removed is manipulated in such a manner as to engage the hook end of the hook C onto the upper rim of the vessel B, as is illustrated in Fig. 2, so that one side of the cover rests against the outside of the vessel B.

It will be seen that when the cover is suspended from the vessel in this manner condensed steam in the cover A is prevented from dripping onto the hot stove, thus avoiding injury to the latter. At the same time the cover when suspended in such a horizontal position forms a convenient receptacle for supporting various articles, such as knives, forks, soap, &c.

I am aware that a pot-cover has had a hook on its lower side extending horizontally toward the center, so that the cover could be suspended vertically edgewise on the pot, and I do not claim the same as of my invention. In my construction the hook is vertical, so that the cover will be held in a horizontal position and the water of condensation will be prevented from falling on the stove, and the cover can, moreover, be used as a place of temporary deposit for articles being boiled, should it be found necessary to withdraw them from the pot for examination. By suspending the cover horizontally it matters not how shallow the vessel may be.

Having thus fully described my invention, I claim as new and desire to secure by Letters Patent—

A vessel-cover having a shank depending vertically from its lower side, the lower end of the shank being bent outward and upward to form a hook whereby the cover may be held horizontally on the rim of a shallow or deep vessel and serve as a temporary shelf, substantially as set forth.

EDWARD W. STONE.

Witnesses:
ROBERT L. TATHAM,
CHARLES R. WEBSTER.